March 2, 1965  J. CALDWELL ETAL  3,171,258
STEAM POWER PLANTS
Filed April 18, 1963  2 Sheets-Sheet 1

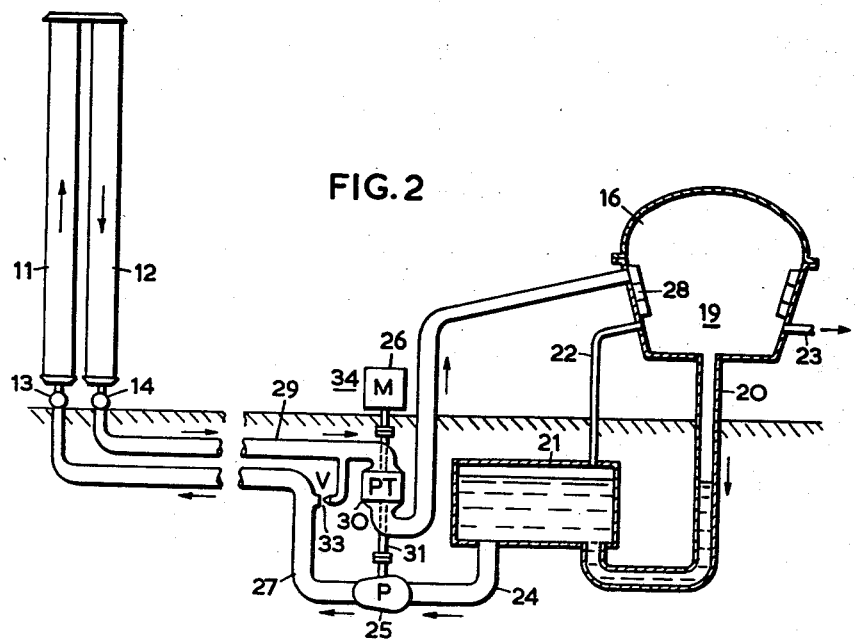
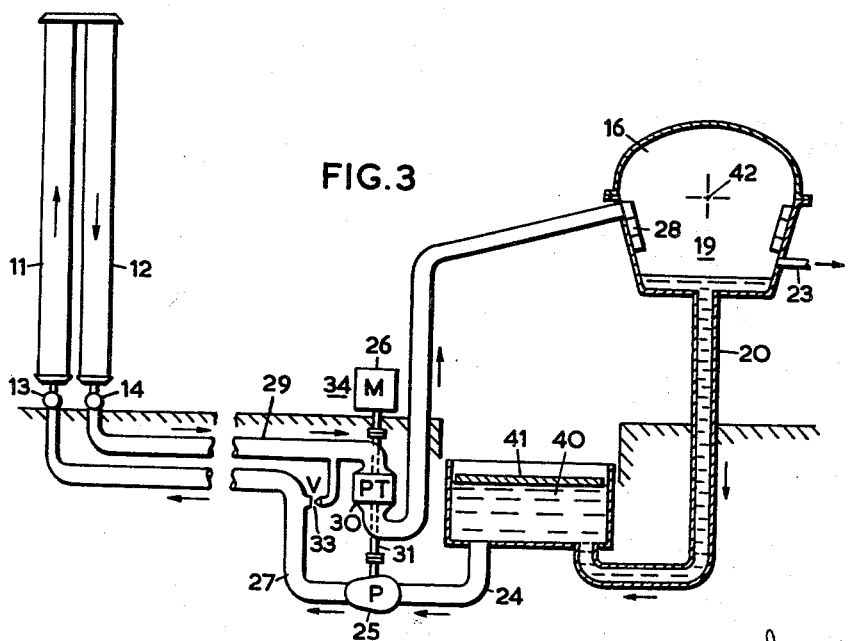

United States Patent Office 3,171,258
Patented Mar. 2, 1965

3,171,258
STEAM POWER PLANTS
John Caldwell, Henry Watson, Geoffrey Bernard Thomas, and John Harold Daltry, Rugby, England, assignors to The English Electric Company Limited, Strand, London, England, a British company
Filed Apr. 18, 1963, Ser. No. 273,920
Claims priority, application Great Britain, Apr. 19, 1962, 15,190/62
5 Claims. (Cl. 60—95)

This invention relates to steam power plants.

According to the invention, such a plant includes a steam turbine, a steam condenser communicating with the turbine, first duct means connected to the condenser for removing water condensate therefrom, water-cooling means connected to the first duct means, second duct means connected between the cooling means and the condenser for returning the condensate to the condenser, a tank for containing condensate below a predetermined level in the tank and connected in the first duct means below the said level, and means on the tank above the said level for maintaining the surface of water in the tank at a predetermined pressure.

Preferably, the water cooling means comprise a dry cooling tower, the turbine and associated parts of the plant being situated within the cooling tower.

According to another feature of the invention, where pump means are provided in the first duct means the tank is connected between the condenser and the pump means.

In one form of the invention, the said means for maintaining the surface of water at a predetermined pressure comprise a pipe connected between the tank and the condenser so as to maintain above the said water surface the same pressure as prevails in the condenser.

In another form of the invention, the said means for maintaining the surface at a predetermined pressure comprise an opening in the top of the tank communicating with the atmosphere, so as to maintain the water therein at atmospheric pressure.

A cooling system for a steam turbine forming part of a plant according to the invention is included in the scope of the invention.

A steam power plant in two forms according to the invention will now be described by way of example and with reference to the accompanying drawings, of which:

FIG. 2 is a diagrammatic elevation showing the principal parts of a condensed steam cooling system forming part of the plant in one of the forms described; and FIG. 3 is a diagrammatic elevation showing the principal parts of the cooling system in the other of the forms described.

Figure 1:
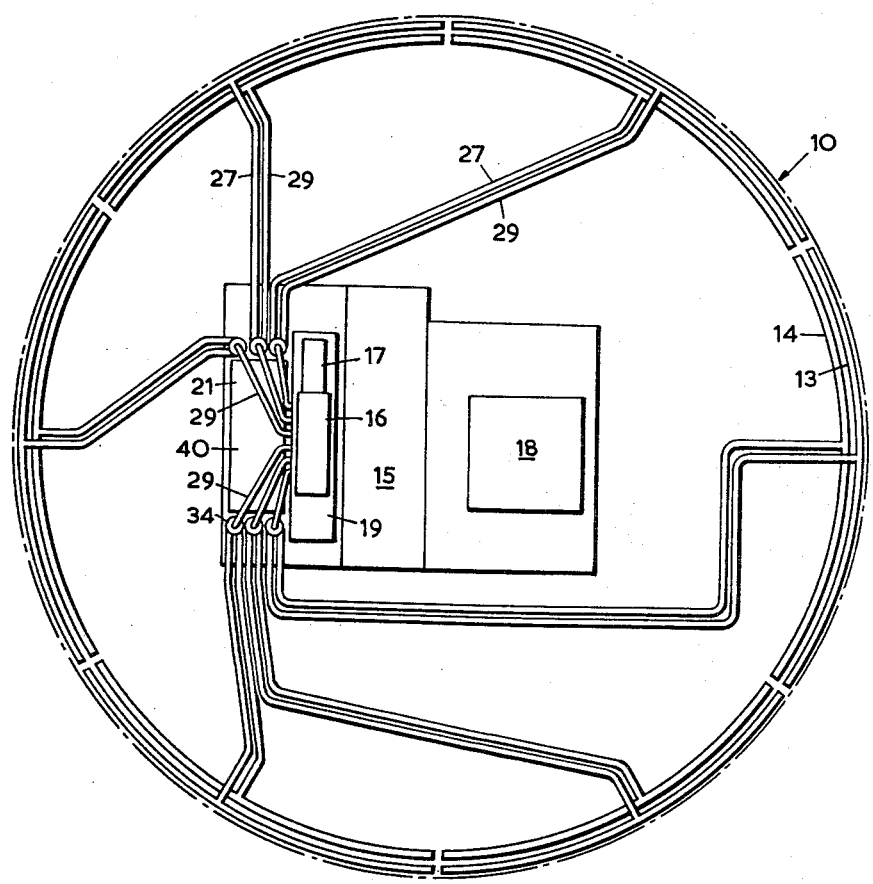
FIG. 1 is a diagrammatic plan view showing the layout of the principal parts of the plant.

With reference first to FIGS. 1 and 2, a dry cooling tower, indicated diagrammatically at 10 in FIG. 1, has around its base a ring of radiators 11, 12 arranged in six equal groups of sectors. In each sector, the radiators 11 are supplied with water at the bottom from an inlet manifold pipe 13, and the top of each radiator 11 is connected so that the water may pass from it to the top of the adjacent radiator 12. The bottoms of all the radiators 12 in each sector drain to an outlet manifold pipe 14.

Inside the cooling tower 10 is a power house 15 containing a steam turbine 16, which drives an alternator 17, and a steam raising unit 18 for supplying steam to the turbine 16.

The turbine is mounted on top of the condenser 19 with which the steam exhaust of the turbine communicates. The bottom of the condenser 19 is connected by a downpipe 20 to an enclosed condensate tank 21, and by a pipe 22 to the top of the tank 21. An air suction pipe 23 connects the condenser to air exhausting means (not shown).

The condensate tank 21 has six drain pipes 24, each of which is connected to the suction side of a pump 25 driven by an electric motor 26, the exhaust side of the pump 25 being connected through a pipe 27 to the inlet manifold pipe 13 of one sector of radiators. The outlet manifold pipe 14 of each sector is connected to a set of sprays 28 in the condenser 19 through a return pipe 29, in which is a small hydraulic propeller-type turbine 30 on the same shaft 31 as the pump 25. A non-return valve 33 is provided to allow drainage from pipe 29 to pipe 27 when necessary. In FIG. 1 the units comprising pump 25, turbine 30 and motor 26 are indicated at 34: each sector of radiators is supplied by one such unit and its associated pipes 24, 27 and 29, but in FIG. 2 only those associated with one sector are shown, for clarity.

The pipes 20, 24 and 27 together constitute a first duct means for carrying condensate from the condenser 19 to the radiators 11, while the pipe 29 constitutes a second duct means.

It should be noted that it is essential for the pipes 20 and 24 to be arranged to enter the tank 21 below, and the pipe 22 above, the water level in the tank, whatever this level happens to be.

In operation, when the turbine 16 is running, exhaust steam from the turbine is condensed in the condenser 19 by the action of the sprays 28, the condenser being maintained at a suitably high vacuum through the air suction pipe 23.

The condensate passes through the downpipe 20 into the tank 21, the upper part of which, above the water level, is under the same pressure, or vacuum, as the condenser by virtue of the pipe 22. The water levels in the tank 21 and downpipe are thus always the same as each other. The pumps 25 pass condensate water from the tank 21 through the pipes 24, 27 and 13 to the radiators 11 and 12, where the water is cooled by the air and is then collected by the pipe 14 and passed back through pipe 29 and turbine 30 to the condenser sprays 28. The turbine 30 assists the motor 26 in driving the pump 25. The direction of water flow in the system is indicated by arrows in the drawings. When it is desired to empty one or more of the radiator sectors 11, 12, for any reason, the corresponding pump 25 is stopped, whereupon water in the radiator 11 and pipes 13 and 27 drains into the tank 21, while that in the radiator 12 and pipes 14 and 29 drains to the tank through the non-return valve 33 and pipe 27. The tank 21 is dimensioned so that it will contain the contents of all the radiator sectors 11, 12, and pipes 13, 14, 27, 29, in addition to its normal contents, without flooding the condenser 19 or turbine 16.

Thus one or more of the radiator sectors 11, 12 may be simply and quickly drained, if desired, while the turbine is running, and it will be appreciated that the water in tank 21 may be kept warm in cold weather as a result of the condensate passing into tank 21 through downpipe 20. The sectors may thus be refilled with warm water, so that the risk of the sectors freezing may be avoided.

With reference now to FIG. 3, in an alternative form of the system, instead of the enclosed tank 21 shown in FIG. 2, having a vacuum above the water in the tank, a condensate tank 40 is provided, connected (in the same way as tank 21) with the pipes 20 and 24. Unlike the tank 21, however, tank 40 is in communication with the atmosphere at the top, and has a floating lid 41 which protects virtually all the surface of the water from actual contact with air and so tends to prevent any serious evaporation of the water and solution of air in the water. The lid 41 is free to move up and down in the tank 40 with variations in the water level.

With this arrangement, there is a difference in level between the water in the tank 40 and that in the pipe 20 or condenser 19, the hydraulic head resulting from this difference corresponding with the vacuum in the condenser. The turbine 16 is placed with its centreline (indicated at 42 in FIG. 3) sufficiently high above the tank 40 to allow for this difference in water level and so avoid the risk of flooding the turbine. By contrast, the level of the turbine in FIG. 2 should be as near to that of the water in the tank 21 as possible (without the latter level being actually so high with respect to the turbine that water in pipe 20 could flood the turbine), so as to minimise energy losses due to the condensate falling freely from the condenser in the pipe 20.

Apart from the differences just described, the system in the form shown in FIG. 3 is generally similar to that shown in FIG. 2, and FIG. 1 may be taken as showing both systems.

The condensate tank 21 or 40 has a large enough capacity to take, if necessary, all the water in the system. The tank must consequently be on the suction side of the pumps 25, so that there can be a water surface in the tank which is either at condenser or at atmospheric pressure, and which is free to change in level.

It will be understood that the invention as described is not confined to use in conjunction with dry cooling towers with six sectors of radiators: there may be any convenient number of such groups, each with its associated pipes, pump, and hydraulic propeller turbine. Similarly it is not essential for the steam turbine or the parts of the power plant associated with it to be inside the cooling tower; however, if they are outside the tower it may be necessary to include valves or booster pumps in the water circuit to compensate for losses in the extra piping thus required.

What we claim as our invention and desire to secure by Letters Patent is:

1. A steam power plant including a steam turbine, a steam condenser communicating with the turbine, first duct means connected to the condenser for removing water condensate therefrom, water-cooling means connected to the first duct means, second duct means connected between the cooling means and the condenser for returning the condensate to the condenser, pump means in the first duct means, a tank for containing condensate below a predetermined level in the tank and connected in the first duct means below the said level and between the condenser and the pump means so as to receive condensate directly from the condenser, and pressure-equalising means communicating with the inside of the tank, above said level so as to maintain the surface of water in the tank at a predetermined pressure.

2. A steam power plant including a dry cooling tower and, within the cooling tower, a steam turbine, a direct-contact steam condenser communicating with the turbine, first duct means connected between the condenser and the cooling tower for carrying water from the condenser to the cooling tower, second duct means connected between the cooling tower and condenser for returning water from the cooling tower to the condenser, pump means in the first duct means, a tank for containing condensate below a predetermined level in the tank and connected in the first duct means below the said level and between the condenser and the pump means so as to receive condensate directly from the condenser, and pressure-equalising means communicating with the inside of the tank, above said level so as to maintain the surface of water in the tank at a predetermined pressure.

3. A steam power plant according to claim 1, wherein the said pressure-equalising means comprise a pipe connected between the tank and the condenser so as to maintain above the said water surface the same pressure as prevails in the condenser.

4. A steam power plant according to claim 1, wherein the said pressure-equalising means comprise means defining an opening in the tank above the said level and means for connecting the said opening with the atmosphere.

5. A steam power plant according to claim 2, wherein there are a number of said first duct means, each having associated therewith a said pump means, tank, means for maintaining the water surface in the tank at a predetermined pressure, and second duct means, and wherein the dry cooling tower comprises a hollow tower and a number of groups of air-cooled radiators arranged around the base of the tower, each group of radiators being connected to a separate said first and second duct means, and the number of first duct means being the same as the number of groups of radiators.

References Cited in the file of this patent

FOREIGN PATENTS

| | | |
|---|---|---|
| 935,010 | Germany | Nov. 10, 1955 |
| 420,413 | Great Britain | Nov. 30, 1934 |
| 875,611 | Great Britain | Aug. 23, 1961 |